July 2, 1963
R. E. CORRIGAN
3,095,653
METHOD OF TESTING THE LEARNING OF PERSONS
Filed April 11, 1960
5 Sheets-Sheet 1
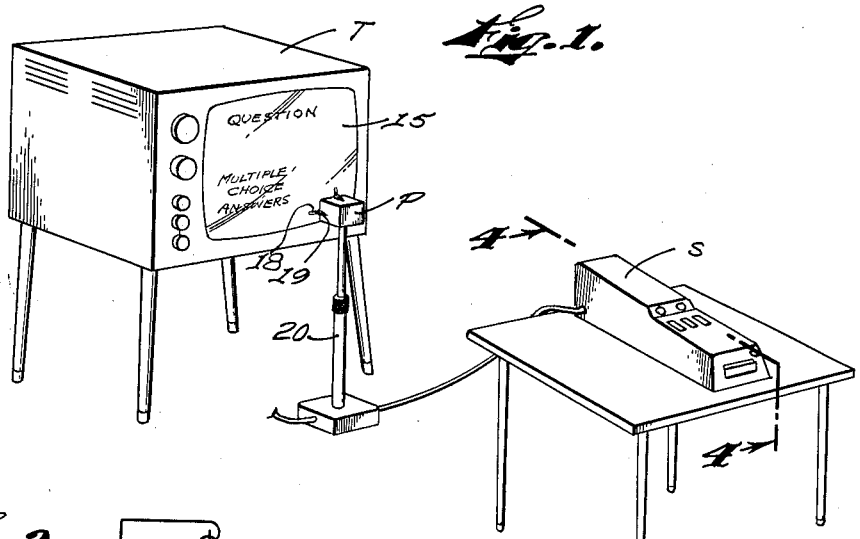
Fig. 1.
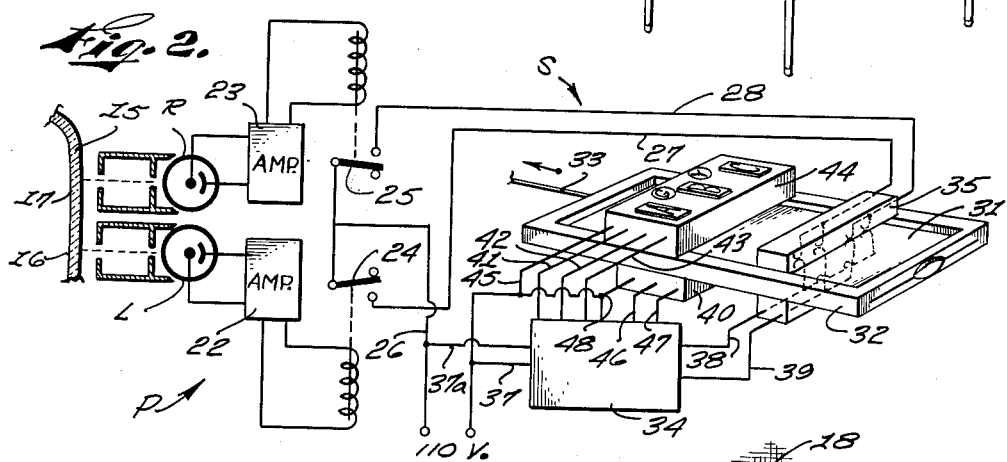
Fig. 2.
Fig. 1a.
Fig. 3.
| CELL L | CELL R | RESULT |
|---|---|---|
| DARK | LIGHT | A |
| LIGHT | DARK | B |
| LIGHT | LIGHT | C |
| DARK | DARK | ADVANCE |
INVENTOR
ROBERT E. CORRIGAN
BY FULWIDER, MATTINGLY & HUNTLEY
ATTORNEYS

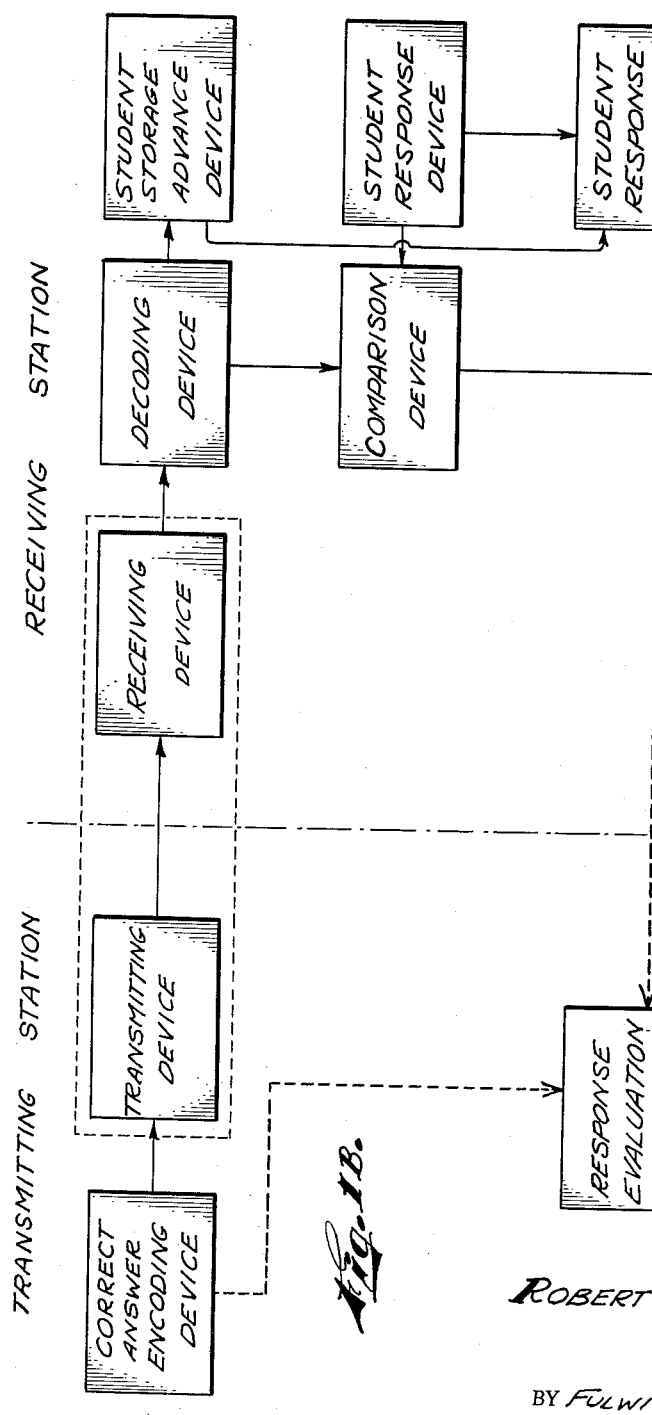

July 2, 1963  R. E. CORRIGAN  3,095,653
METHOD OF TESTING THE LEARNING OF PERSONS
Filed April 11, 1960  5 Sheets-Sheet 3
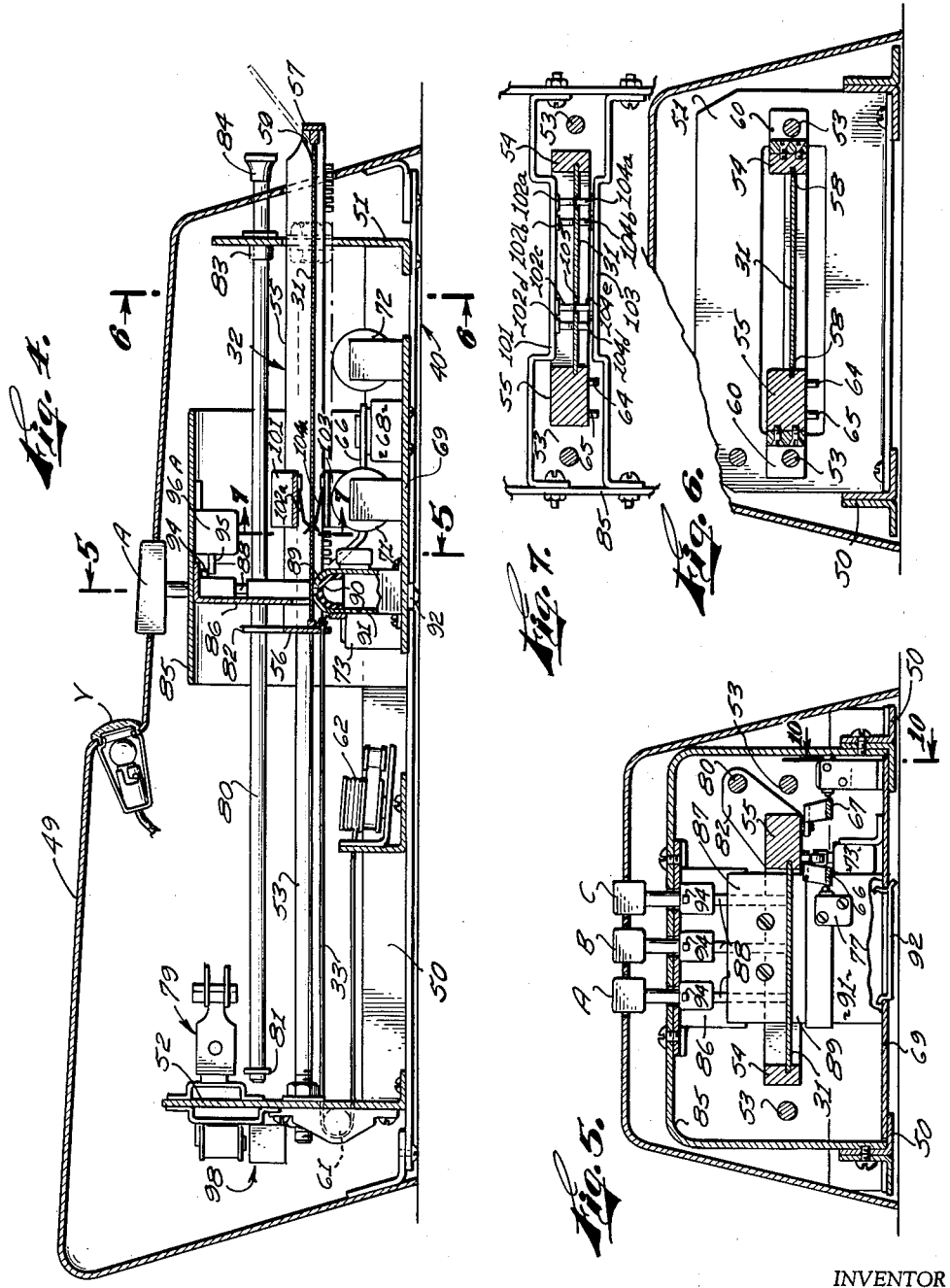
INVENTOR
*Robert E. Corrigan*
BY *Fulwider, Mattingly & Huntley*
ATTORNEYS July 2, 1963
R. E. CORRIGAN
3,095,653
METHOD OF TESTING THE LEARNING OF PERSONS
Filed April 11, 1960
5 Sheets-Sheet 4
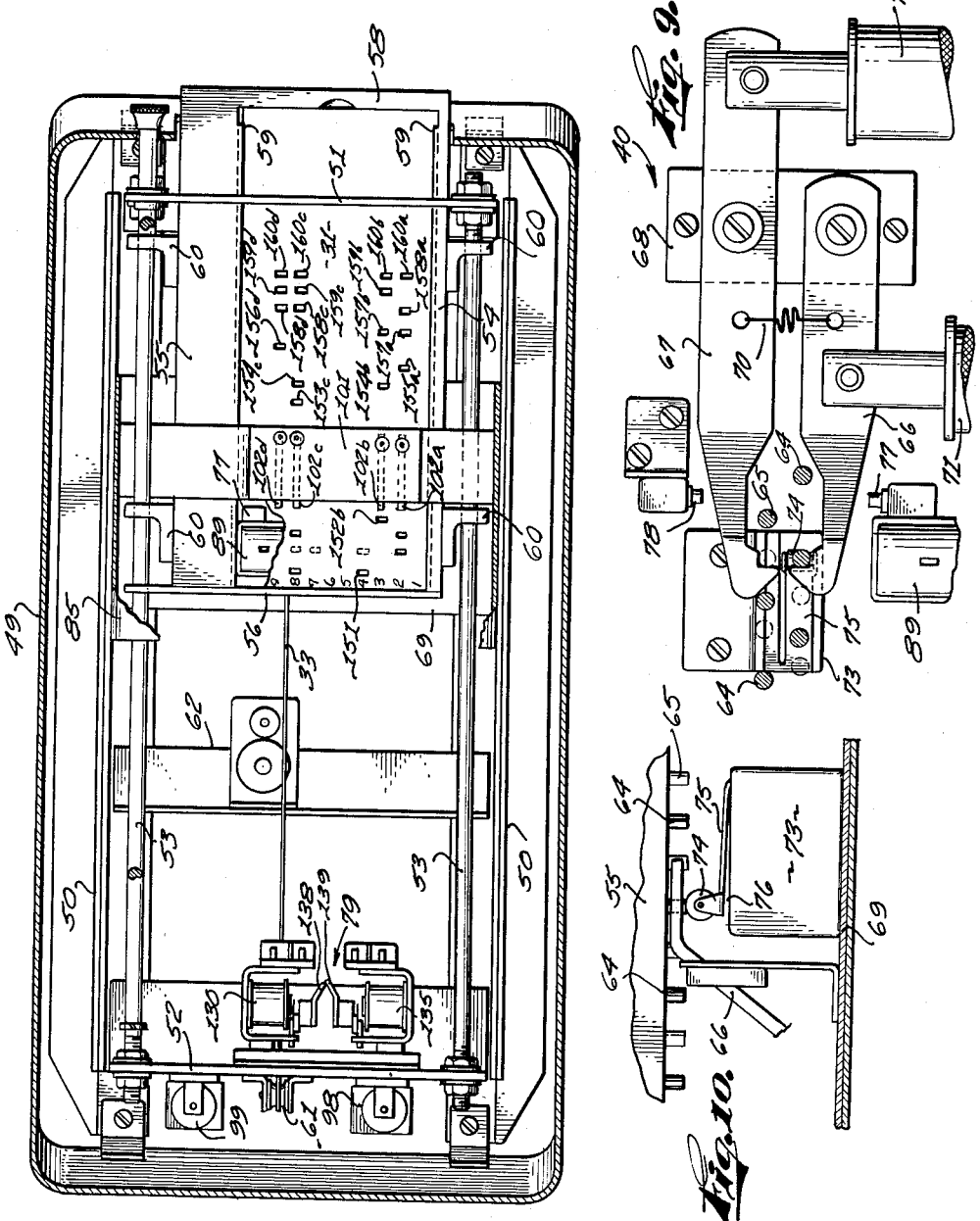
INVENTOR
*Robert E. Corrigan*
BY *Fulwider, Mattingly & Huntley*
ATTORNEYS July 2, 1963

R. E. CORRIGAN 3,095,653

METHOD OF TESTING THE LEARNING OF PERSONS

Filed April 11, 1960

INVENTOR
ROBERT E. CORRIGAN

BY Fulwider, Mattingly & Huntley

ATTORNEYS

United States Patent Office 3,095,653
Patented July 2, 1963

3,095,653
METHOD OF TESTING THE LEARNING OF PERSONS
Robert E. Corrigan, Garden Grove, Calif., assignor to Corrigan Communications, Inc., Garden Grove, Calif., a corporation of California
Filed Apr. 11, 1960, Ser. No. 21,167
14 Claims. (Cl. 35—9)

The present invention relates generally to a method and apparatus which are especially useful in the testing of and the evaluating of the learning of persons and more particularly to such apparatus which is capable of immediately informing the student of the correctness of his answers to questions asked of him during the testing process and where such responses by the student are recorded in a form for evaluation of individual and group performance by automatic processing machines for said testing situations.

The present invention is directed to method and apparatus by which a single instructor or instruction mechanism may control the testing situation simultaneously for many students separated from the instructor and from each other in such a manner that (a) each student receives immediate knowledge of results of his individual efforts after every attempt to answer every question and (b) each response by each individual student is tabulated automatically on a storage medium at the time of the response. The method may be carried out by means of various forms of the apparatus through any communication medium and in any remote or local testing situation.

Specifically, the present invention provides method and apparatus by which a specific student response at any remote location may be compared with the appropriate correct response desired by the instructor. Also the results of the comparison may be used to inform the student instantly of his individual success. Moreover, the results of the comparison may be used to effect storage of the individual student's responses. The instructor may be informed of the behavior of the students, in mass or individually, for single questions or combinations thereof.

The method and apparatus of the present invention has a primary use in the field of testing and evaluation with persons through the medium of television. In instruction with television it is desirable to give tests periodically to students for the purpose of evaluating their acquisition of knowledge and for giving intermediate and final grades in a specified course. In conventional practice the television instructor has no direct contact with or control of each television student. The television student in heretofore proposed methods writes on a piece of paper or selectively by other means records his answers to test questions which can then be mailed to the administrator of the course by the individual student. Alternatively, these answers are collected by the class monitor for groups of subjects and then transported to the television instructor. Such heretofore-proposed methods give rise to several serious deficiences, as for example, the television instructor is not in direct contact with each television student. Additionally, the television instructor cannot control the time period which the students spend on each question; nor can he control the definitive time allotted for each student to respond to each specific question. There is no assurance, therefore, that the student will not wait for the answer provided by the television instructor following the presentation of the test question, and then to record it as being correct. Finally, the individual television student is not provided immediate knowledge of results of the correctness or incorrectness of his responses to the test questions as they are made. It has been found that the student will learn more efficiently if during the testing period he is informed of the correctness of his answer immediately after he has selected it. This cannot be done with prior testing devices with television because methods have not been devised by which the student can be individually informed of the correctness of his choice and each successive choice as in the case of multiple choice questions.

It is a major object of the present invention to provide a novel method and apparatus that overcomes the abovementioned deficiences of the prior art.

Testing methods and apparatus incorporating the principles of the present invention overcome these shortcomings of the heretofore proposed methods by sending from the studio a coded signal and sensing such signal at any particular television set with which the apparatus is used, comparing this signal with an input generated by the students as they select what they believe to be the correct answer, informing the students of the result of this comparison and storing the result on card storage. In the case of multiple-choice questions, a proper signal is broadcast by the television station to each television set in such a manner which allows the identification of each choice as correct or incorrect. Then, the apparatus of the present invention can pick-up that signal for the comparison purposes mentioned above.

Another object of this invention is to provide apparatus which will enhance testing efficiency through media such as television.

It is a further object of this invention to provide novel apparatus for testing the knowledge of a television viewer which will immediately inform that viewer on an individual basis of the results of test questions taken with the use of such apparatus.

A still further object of this invention is to provide apparatus for use with a means which transmits intelligence in the form of signals; said apparatus being capable of recording inputs from an operator, comparing those inputs with the signals, and informing the operator of the results of the comparison.

It is still another object of the present invention to provide a unique system which is capable of obtaining information from a television set by which questions are asked of an individual viewer and using that information to inform that viewer on an individual or group basis of the accuracy of such inputs as answers to the questions.

It is a still further object of the present invention to provide for use with ordinary television sets, apparatus which is capable of sensing intelligence in the form of signals on the television screen, recording inputs from persons viewing the television screen, controlling the position of those inputs, comparing those inputs with the signals, and immediately informing such persons of the results of the comparison for each test question presented.

Other objects of this invention will become apparent in the detailed description below in conjunction with the attached drawings wherein:

FIGURE 1 is a pictorial view of the receiving station apparatus of a testing system incorporating the principles of the present invention;

FIGURE 1a is a fragmentary view of a corner of a television screen in front of which is located the pick-up of the system shown in FIGURE 1;

FIGURE 1b is a complete block diagram of the system embodying the present invention showing the transmitting and receiving station functions;

FIGURE 2 is a general block diagram of said system;

FIGURE 3 is a chart illustrating the results of forming various combinations of light and dark in front of the pick-up photo cells of the system shown in FIGURE 1;

FIGURE 4 is a vertical cross-sectional view of the recorder shown in FIGURE 1 taken along line 4—4 in that figure;

FIGURE 5 is a vertical cross-sectional view taken along line 5—5 of FIGURE 4;

FIGURE 6 is a vertical cross-sectional view taken along line 6—6 of FIGURE 4;

FIGURE 7 is a fragmentary vertical sectional view taken along line 7—7 of FIGURE 4;

FIGURE 8 is a partially cut away top plan view of the recorder;

FIGURE 9 is an enlarged fragmentary top view of an escapement mechanism used with the recorder;

FIGURE 10 is an enlarged fragmentary cross-sectional view of an escapement mechanism selector switch of the recorder taken along line 10—10 in FIGURE 5.

The System in General

Figure 11:
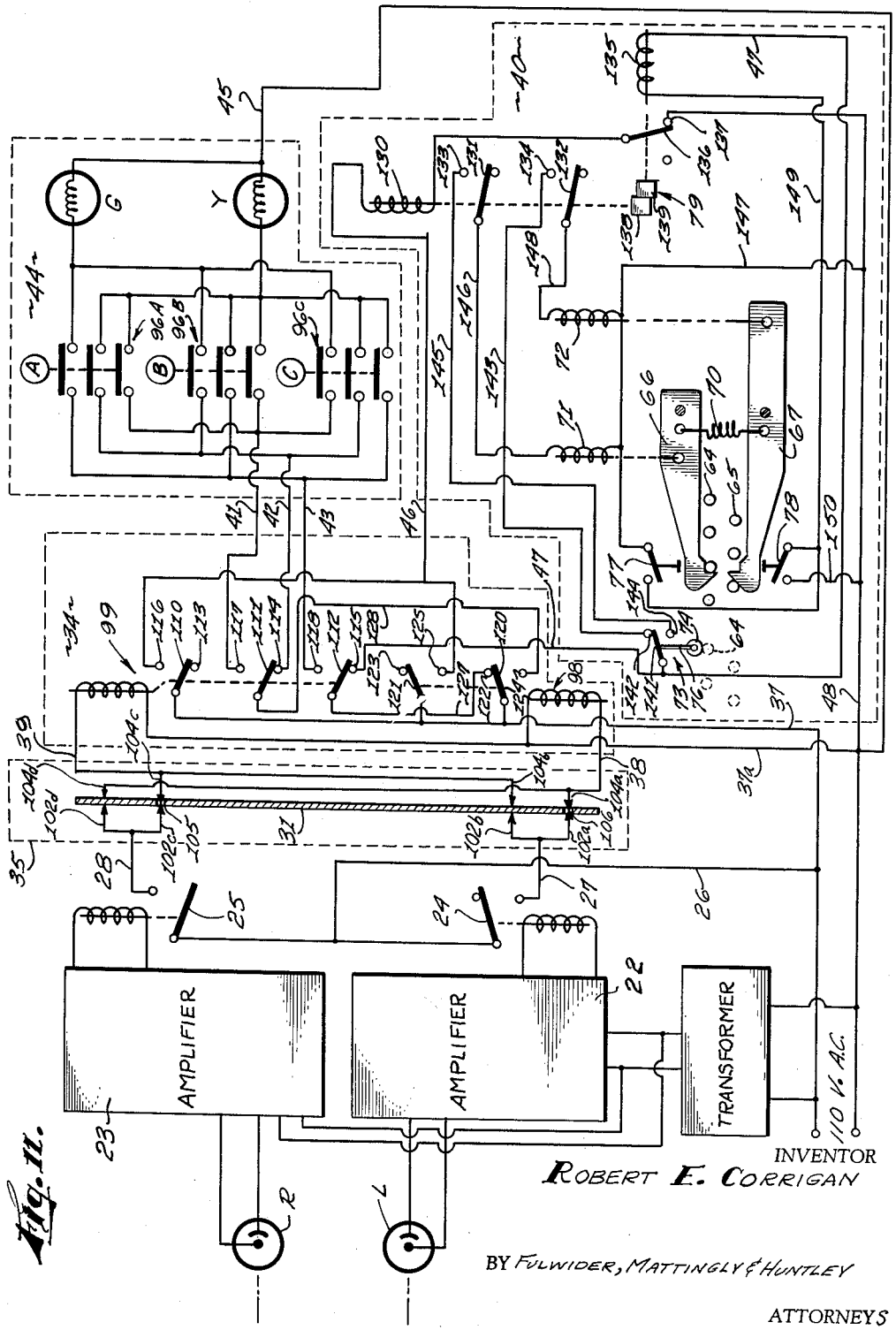
FIGURE 11 is a detailed electrical schematic diagram of the system shown in FIGURE 1.

Referring first to FIGURE 1, there is shown a suitable receiving station apparatus of a testing system embodying the present invention. This receiving station apparatus includes a conventional television set T having a television screen or tube face 15. A pickup P is positioned at the lower right-hand corner of the screen 15. A recorder S is operatively connected to the pickup P as by means of suitable cables.

Referring now to FIGURE 1b, there is shown a block diagram of a system embodying the present invention. It should be noted that the television set T is adapted to receive coded signals from apparatus such as a conventional television transmitter. These coded signals may show up as two spots on the screen 15 of each television receiver T comprising the system. It should be particularly observed that although a television communication system is shown and described in conjunction with the present invention, other suitable communication media may be employed.

The television transmitter is shown operatively connected to a suitable answer encoding device. This device will automatically apply the proper coding to the signals sent by the transmitting apparatus each time the instructor or an instruction mechanism selects one of a plurality (such as three) answer keys. Where these coded signals consist of two spots on the screen 15 either spot may be independently switched to black or white as required responsive to the output of the encoding device. The encoding device allows the instructor to enter information as to correct answers into the system. This information is transmitted through the system by means of the transmitter, the television receivers T and pickup P to a decoding device forming a part of the aforementioned recorder S. This permits a comparison device also forming a part of the recorder S with a standard against which to compare the responses received from the students by means of a student response device forming part of their individual recorders S. The results of such comparison are transmitted to a student knowledge result panel for viewing by the student. This panel also forms a part of the recorder S. The student responses are additionally entered into a storage register forming a part of the recorder S. In the preferred embodiment of the present invention such entries are made by means of punches in a conventional punch card, such as those presently marketed by International Business Machines and commonly termed IBM punch cards. The storage register is prepared to receive each student response from the student response device Y. The recorder S also includes a student storage advance device that advances the storage medium into position for receiving each subsequent student response. The storage medium, i.e. the IBM punch card may be removed from the recorder S and transported to a central evaluation center shown in FIGURE 1b. At this center the student responses are evaluated and data is compiled concerning the student's performance.

The Receiving Apparatus in General

The present apparatus is particularly adapted to handle questions with which are given a plurality of multiple choice answers, as for example, three multiple choice answers. Therefore, groups of questions with three answers may be assumed as being shown sequentially on the screen 15 of each television set T. Simultaneously, as illustrated in FIGURE 1a, a signal to indicate the correct answer is broadcast in a conventional manner to illuminate either or both of a pair of spots 16 and 17, respectively, on the lower right-hand portion of screen 15.

The pickup P has a left-hand photo cell L and a right-hand photo cell R of conventional construction which are placed in alignment with the spots 16 and 17 to sense the signal and feed it to the recorder S. To aid in this positioning, alignment lines 18 may be broadcast on the screen 15 prior to the test. Then, as illustrated in phantom lines, in FIGURE 1a, protuberant portions 19 provided on the housing of the pickup P are aligned with these lines 18 by properly positioning the telescoping stand 20 which supports the pickup P.

Referring now to FIGURE 2, the pickup P is shown adjacent the screen 15 at the left-hand portion of this figure. It will be observed that connection to photo cell L is a conventional electrical amplifier 22 which, when the photo cell L is exposed to light at spot 16, actuates an electric solenoid switch 24. A conventional electrical amplifier 23 is connected to similarly operate switch 25 when photo cell R is exposed to light at spot 17. Preferably, the amplifiers 22 and 23 are of the transistor type. As can be seen, the switch arms of switches 24 and 25 are connected to one side of a 110 volt power source through lead 26. With this arrangement, a circuit may be completed through leads 27 and 28 or both, whenever either switch 24 or switch 25 or both are actuated.

In FIGURE 3, there is shown a chart illustrating the results of forming various combinations of light and dark in front of the photo cells L and R. As illustrated by the left two columns in FIGURE 3, four signals may be sent by the two photo cells L and R. The signals are transmitted to the rest of the circuit through leads 27 and 28 by connecting a circuit through lead 27 or through lead 28, or through both of these leads, or through neither of these leads.

Referring again to FIGURE 2, in order to permanently record the result of the tests the recorder S utilizes an IBM-type punch card or Re Rand, etc. 31 that is carried in carriage 32 which is continuously urged to the left by tension on a cable 33. Connected to both sides of the 110 volt power source through wires 37 and 37a is main switch means 34. As illustrated, switch means 34 is connected to leads 27 and 28 through scrambling means 35 and leads 38 and 39. The scrambling means 35 essentially comprises several pairs of opposed contacts which cooperate with pre-punched holes in the card 31 and are capable of transposing, superimposing or otherwise scrambling any signal through wires 27 and 28. Many permutations of the original signal are available through the use of this scrambling system. The apparatus, however, can operate without using the scrambling means. Therefore, in order to facilitate the description of the present system, the mode of operation will be described initially on the basis that any current through wire 27 passes directly into lead 38 only and similarly lead 28 is connected only to lead 39.

Located below the carriage 32 is escapement means 40 which cooperates with a series of pins (not shown) depending from the underside of the carriage 32. The escapement means 40 is connected to the switch means 34 by leads 46 and 47 as well as to one side of the 110 volt power source through lead 48. Further, because of the circuitry within switch means 34, the escapement means allows cable 33 to move the carriage 32 one position to the left every time the light is removed from photo cells L and R, i.e., when spots 16 and 17 are not illuminated. (see FIGURE 3.)

Connected to the switch means 34 through leads 41, 42, and 43 and located above the carriage 32 is selecting means 44. The selecting means 44 is connected to one side of the 110 volt power source through wire 45, as illustrated, and also has three buttons A, B and C. Each of these buttons is connected to a punch which will punch the card 31 when the particular button is depressed to record an answer. The buttons A, B and C also have electrical switches connected to each of them which are connected together and through leads 41, 42 and 43 to the electrical switch means 34 in such manner that the following results occur (see FIGURE 3):

(1) If the circuit is complete through lead 39 (switch 25 being actuated) and button A is pushed, green light G will be illuminated whereas if either of the buttons B or C is pushed at such time, red light R will immediately be illuminated to indicate a wrong answer;

(2) If the circuit is complete through lead 38 (switch 24 being actuated) and button B is pushed, green light G will be illuminated indicating a correct answer, whereas if either the button A or C is pushed at such time, the error indicating red light R will be illuminated;

(3) If the circuit is complete through both leads 38 and 39 (switches 24 and 25 both being actuated) and button C is pushed, the green light G will be illuminated, whereas if either of the buttons A or B is pushed, the red light Y will indicate a wrong answer.

With such circuitry, the present system may be operated in the following illustrative manner. Assume that the instructor or instructing mechanism asks a question having three multiple choice answers, of which A is the correct answer. Simultaneously, the television transmitter will cause each television set T in the system to illuminate at spot 17 on the tube face 15 causing the switch 25 to be actuated. This would complete circuit through lead 39 and the correct answer-indicating green light G will be illuminated only if the button A is pushed. Then, when the instructor is ready to proceed to the next question, the television transmitter darkens the spot at 17, as well as at 16, which causes the escapement means 40 to be actuated, whereupon the carriage 32 is advanced one position. At this time, the apparatus is ready for the next question.

Mechanical Details of the Recorder

Having described the general manner of operation of the preferred form of apparatus embodying the present invention, reference should now be had to FIGURES 4 through 10 illustrating the mechanical details of the recorder S. The recorder S is enclosed in a housing 49 which performs the dual function of presenting an attractive appearance and excluding foreign objects from the operating mechanism of the recorder. Extending longitudinally along the lower left and right-hand sides of the housing are T-shaped frame runners 50 each of which is formed of a pair of right angle members. Attached to the frame runners are front and rear standards 51 and 52, respectively, which support a pair of guide rails 53, as shown. The aforementioned carriage 32 comprises left and right side members 54 and 55, respectively, which are attached together rigidly in spaced relation by means of rear plate 56 and front end component 57 extending laterally, as shown. In order to support the card 31, the side members 54 and 55 are each provided with a groove 58. The groove 58 is curved up and cut away at 59 in order that the card may be more easily inserted, as illustrated by the phantom line in FIGURE 4.

Attached to the side members 54 and 55 of the carriage 32 are brackets 60 which have holes through which the guide rails 53 are received. Thereby, the carriage 32 is horizontally slideably supported on the guide rails for forward and rearward movement within the housing 49. To move the carriage 32 rearwardly, the cable 33 extends rearward and then around a drum 61 attached to the rear standard 52 and then back to a spring-driven drum 62. The drum 62 exerts a continuous force on the carriage 32 and therefore the escapement means 40 may advance the carriage 32, as desired by intermittently releasing it.

The escapement means 40 includes a roll of left-hand pins 64 and a roll of right-hand pins 65 which depend from the lower surface of side member 55. These pins 64 and 65 are staggered. As illustrated best in FIGURES 4 and 9, this arrangement allows a left-hand pawl 66 and a right-hand pawl 67, pivotally secured to a block 68 affixed to a support plate 69, to alternately engage the pins 64 and 65. The pawls 66 and 67 are urged together into pin-engaging relation by a tension spring 70. In order to pull the left-hand pawl 66 out of the path of travel of the pins 64, a conventional electric solenoid 71, affixed to a plate 69 is fastened to the pawl as shown. Similarly, a second solenoid 72 is connected to right-hand pawl 67 to pull the pawl out of the path of travel of the roll of pins 65 when the solenoid 72 is energized.

As will be set forth in more detail in conjunction with FIGURE 11, a double-throw single pole selector switch 73 cooperates with the pins 64 and 65 to cause the solenoids 71 and 72 to operate in proper sequence. As illustrated best in FIGURES 9 and 10, the switch 73 has a roller 74 rotatably supported on a spring arm 75 in such position that the roller is engaged by each left-hand pin 64, as the pin is engaged by the left-hand pawl 66. With this arrangement, the contact closing button 76 of the switch 73 is forced to its lower position when the roller 74 is engaged by the pin 64, as shown. In this condition, the switch 73 will cause the solenoid 71 to be actuated when it is desired to advance the carriage 32.

When the pawl 67 is engaging the pin 65, the roller 74 is not held in its lower position which allows the button 76 to move to its upper position. In this condition, the switch 73 causes the solenoid 72 to be actuated, when desired.

Located in the path of swing of the pawls 66 and 67 are normally open electrical switches 77 and 78, respectively. These switches are provided for the purpose of de-energizing the solenoids 71 and 72 at the proper time, as will be described in more detail below. Latching relay 79 attached to the rear standard 52 is also part of the escapement means 40 and operates as will be described in conjunction with FIGURE 11.

After the carriage 32 has been allowed to move to the rear position, it is pulled back to the front manually. For this purpose a return rod 80, which is encircled at its forward end by washer 81, extends through a hole in flange 82 on rear plate 56, grommet 83 on front standard 51 and a hole in the rear of the housing 49 in slideable relation. With this arrangement, the carriage 32 may be returned to its front position by grasping knob 84 and pulling the rod 80, and therefore the carriage 32, forwardly. Thereafter, one of the pawls 66 and 67 will hold the carriage 32 in that position.

With reference now to the punching apparatus of the selecting means 44, an internal frame component 85 is located at an intermediate position within the recorder S for supporting the punching apparatus. Affixed to the frame component 85 is a depending guide support 86 carrying a punch guide block 87. Punches 88 fastened to buttons A, B and C, respectively, are reciprocably located, as shown, and are resiliently urged to the upper position illustrated by means of compression springs (not shown) disposed within the guide block 87.

Located below the punches 88 and the card 31, is a semi-cylindrical anvil 89 having holes therethrough through which the lower end of the punches 88 may pass in the punching operation. A semi-cylindrical rubber wiper 90 is affixed below the anvil 89 to remove the punched-out portions of the card 31 from the punches 88. The punched-out portions of the card 31 fall into box 91 below the anvil 89 where they may be removed through door 92 in the support plate 69.

Each of the punches 88 has a pin 94 projecting forwardly to engage a respective actuating arm 95 on a different respective switch 96A, 96B and 96C. (Switches 96B and 96C are illustrated only in FIGURE 11.) These switches are conventional three ganged, normally open switches. As will be described in detail below, these switches are suitably connected to the wiring of recorder S to cause either the green light G or the red light R to be lit according to the combination of the signal from the television set and the button A, B or C depressed by the student.

Located on the rear side of standard 52 is a left solenoid-operated switch 98 and right solenoid-operated switch 99. In FIGURE 2, these two switches are represented by the block 34 and are activated by the particular signal received through the coding means 35 from the solenoid-operated switch 24 or 25.

In the embodiment of the invention shown, holes are pre-punched in four of the rows on the card 31. These "coding holes" cooperate with the scrambling means 35 to code the signals from the television set T. The mechanical structure of the scrambling means 35 may be seen in FIGURES 4, 7 and 8. Located just in front of a punching apparatus is an upper support 101 which is attached at its ends to internal frame component 85 and has a series of four resilient electrical contacts 102a, 102b, 102c and 102d affixed to it. These contacts are aligned with rows 2, 3, 8 and 9, respectively, on the card 31 in which the "coding holes" are punched. Attached to the frame component 85 immediately below the upper support 101 is a lower support 103 to which resilient electrical contacts 104a, 104b, 104c, and 104d are affixed in opposed relation to the correlative upper resilient contacts. With this arrangement, the circuit may be completed through the card 31 through coding holes, such as 105 and 106 (FIGURE 11).

Electrical Circuitry of the Recorder S

Referring now to FIGURE 11, the manner in which the recorder S operates will be described in detail from an electrical standpoint. To facilitate the understanding of the schematic diagram in FIGURE 11, the electrical components which form the means represented by the blocks 34, 35, 40 and 44, in FIGURE 2, have been enclosed by dashed lines and are designated by those numbers.

With the contacts 102a and 104a abutting each other through hole 106, solenoid switch 98 will be actuated when light on photo cell L actuates switch 24. Similarly, with contact 102c abutting contact 104c through hole 105 as shown, solenoid switch 99 is actuated whenever light upon photo cell R causes switch 25 to be actuated. To facilitate the understanding of the circuit diagram, the details of the manner in which the scrambling means 35 operate will be deferred until after the entire system has been described.

As shown, the right solenoid switch 99 comprises three ganged switch arms 110, 111, and 112, respectively, which in the unenergized position abut terminals 113, 114 and 115, respectively, said arms contacting terminals 116, 117 and 118, respectively, when the solenoid switch is actuated. Lead 41 is connected to terminal 117 at one end and divides at its other end where it is connected to one of the three ganged switches of each of the switches 96A, 96B and 96C, as shown. Similarly, leads 42 and 43 are connected to terminals 114 and 118, respectively, at one end, and each is divided at its other end to be connected to the switches 96A, 96B and 96C, as shown.

Solenoid switch 98 has two switch arms 120 and 121 which are ganged together. As illustrated, the switch arms 120 and 121, respectively, contact terminals 122 and 123 in the unenergized position and contact terminals 124 and 125 when the solenoid switch 98 is energized.

Operation of the Selecting Means

In order to understand how the selecting means 44 cooperates with the switch means 34 to inform the student immediately whether his answer to the test question is correct or incorrect, let it be assumed that the instructor has given a test question to which multiple-choise answer A is correct. In that case, the television transmitter would illuminate spot 17 on the television set screen 15 in front of photo cell R. This would cause switch 25 to actuate which in turn would actuate switch 99.

At this time, if the student pushes the A button, thus closing the ganged switches of switch 96A, the green light G would be illuminated because the circuit is closed from one side of the 110 volt power source through lead 45, light G, the top arm of switch 96A, lead 43, terminal 118, switch arm 112, lead 127, terminal 122, switch arm 120 and lead 37 to the other side of the power source. If the B button were pushed, the red light Y would be illuminated because a circuit then would be completed through lead 45, light R, the middle arm of switch 96B to wire 43 from which point the circuit is the same as described just above. If the C button were pushed, the red light R would be illuminated indicating an incorrect answer because the circuit would be completed from lead 45, through red light R and bottom arm of switch 96C to lead 43 from which point the circuit is the same, as described in conjunction with button A above.

Assuming that the instructor has given a question to which the answer B was correct, the television screen 15 would be illuminated at spot 16 in front of the photo cell L. This would actuate switch 24 which in turn actuates switch 98 moving the switch arms 120 and 121 into contact with terminals 124 and 125. If button A were pushed at this time, the red light Y would be illuminated because a circuit would be complete through lead 45, light Y, the middle arm of switch 96A, lead 42, terminal 114, switch arm 111, lead 128, terminal 124 and switch arm 120 to lead 37. If button B were pushed the green light G would be illuminated indicating a correct answer because the circuit would be completed from lead 45 through light G and the top arm of switch 96B to lead 42 from which point the circuit is the same as described just above. Correspondingly, if button C were pushed, the red light would be illuminated because the circuit would become complete from lead 45 through light Y and the middle bar of switch 96C to lead 42.

If the instructor gives a question to which answer C is correct, he will cause the television screen 15 to be illuminated at both spots 16 and 17 in front of both photoelectric cells L and R. This would cause both switches 24 and 25 to be actuated which in turn would cause switches 98 and 99 to be actuated. If button A were pushed by the student at this point, the red light R would be illuminated because the circuit would be completed from lead 45 through light Y, the bottom arm of switch 96A, lead 41, terminal 117, switch arm 11, lead 128, terminal 124 and switch arm 120, to lead 37. If the student pushed button B, the red light Y would be illuminated because the circuit would then be complete from lead 45 through light Y and the bottom arm of switch 96B to lead 41 from which point the circuit would be the same as described just above. If the student pressed button C, green light G would become illuminated because the circuit would be complete from lead 45 through light G and the top arm of switch 96C to lead 41.

Electrical Circuit of the Escapement Means 40

The circuitry of the escapement means 40 is enclosed by the dashed lines and located at the lower right-hand portion of FIGURE 11. The latching relay 79 has a first solenoid 130 which may be energized to pull ganged switch arms 131 and 132 into contact with terminals 133 and 134, respectively. The relay 79 also has a second solenoid 135 which upon actuation pulls switch arm 136 into contact with terminal 137. It will be noted that two small blocks 138 and 139 are shown located adjacent each other at the ends of the dashed lines passing through the solenoids 130 and 135, respectively. As can be seen, best in FIGURE 8, these blocks represent latching arms 138 and 139 which cooperate to hold the switch arms 131 and 132 and 136 in the position assumed after either solenoid 130 or 135 has been energized. In other words, when solenoid 135 is energized pulling switch arms 136 to terminal 137, latching arm 139 is pulled out of the way of latching arm 138 allowing the latter arm to move into a position where it prevents the switch arm 136 from returning to its unenergized position. This condition is illustrated in FIGURE 8 and in FIGURE 11. Conversely, if solenoid 130 is energized, the latching arm 138 is pulled out of the way allowing latching arm 139 to pivot to a position where it will hold arm 138, and switch arms 131 and 132, in the actuated position after solenoid 130 is de-energized. At the time arm 139 is pivoting, the switch arm 136 returns to the unenergized position.

As mentioned above, selector switch 73 controls the position of the two pawls 66 and 67 at a particular time. For clarity in FIGURE 11, the switch 73 is illustrated abutting a pin 64, shown in dashed lines, to the left of pawl 66, rather than the pin 64 engaged by pawl 66, as in FIGURE 10. The switch 73 has, connected to lead 47, a single arm 141 which may alternatively contact terminal 142 or 144. With the roller 74 engaging a pin 64, switch arm 141 contacts the terminal 142 which, by means of lead 143, is connected to the terminal 134. When the roller 74 is not abutting a pin 64, the switch arm 141 is moved by a spring (not shown) into contact with the terminal 144 which is connected to terminal 133 by means of lead 145.

As further illustrated, one side of solenoid 71 is connected to switch arm 131 by means of lead 146 while the other side of the solenoid is connected through lead 147 to lead 48. Solenoid 72 is also connected at one side to lead 48 through lead 147 and is connected at its other side to switch arm 132 by means of lead 148.

Upon inspection, it will be noted that the right side of solenoid 135 is connected to terminal 115 of solenoid switch 99 through lead 47. The other side of solenoid 135 is intermittently connected to lead 48 through lead 149 and lead 147 when switch 77 is closed by actuation of pawl 66, or through leads 149 and 150 when switch 78 is closed by actuation of pawl 67.

*Operation of the Escapement Means*

With the exception of the position of selector switch 73 the circuitry of the escapement means 40 is shown as it would appear just after either the pawl 66 or 67 has been actuated and released. Briefly, the operation of the escapement means at this point is as follows. Actuation of either switch 98 or switch 99 by illumination of spot 16 or 17 energizes solenoid 130 which "sets up" the escapement means 40. When it is time to go on to the next question, the light at either spot 16 or 17 is turned off which causes solenoid 71 or 72 to pull pawl 66 or 67, respectively, according to the position of selector switch 73. The pawl which is moved closes the adjacent switch 77 or 78, which actuates solenoid 135 and returns the escapement means to the condition shown in FIGURE 11.

Following is a more detailed description of the operation of the escapement means. In the condition shown, neither solenoid 71 nor solenoid 72 can be actuated because neither switch arm 131 nor switch arm 132 is contacting terminal 133 or 134, respectively. Solenoid 130 is connected so that it will "set up" the escapement means when either or both of the solenoid switches 98 and 99 are actuated by the answer to the next question illuminating either or both of the spots 16 and 17. To this end, one side of solenoid 130 is connected through lead 46 to terminals 125 and 116 of switches 98 and 99, respectively. Upon inspection, it will be seen that upon actuation of either switch 98 or 99, a circuit will briefly be formed from lead 37 through either switch arm 110 or 121 to lead 46, and then through solenoid 130, switch arm 136, and terminal 137 to lead 48. This will actuate solenoid 130 which allows the contact between switch arm 136 and terminal 137 to be broken; however, the cooperation of the latching arms 138 and 139 will hold switch arms 131 and 132 in their energized position thus holding the escapement means in the "set up" condition.

It should be noted that at this point nothing happens to either pawl 66 or pawl 67 so long as either solenoid switch 98 or 99 remains energized. This is because although the circuit is not broken at 133 and 134 and switch arm 141 completes the circuit from one of those terminals to lead 47, lead 47 does not communicate with lead 37. More specifically, when neither solenoid switch 98 nor switch 99 is energized, lead 47 communicates with lead 37 via terminal 115, switch arm 112, lead 127, terminal 122, and switch arm 120. However, if solenoid switch 98 is energized, switch arm 120 will not be contacting terminal 122. If solenoid switch 99 is energized, the circuit is open between switch arm 112 and terminal 115.

When the instructor decides that it is time to go on to the next question, the light at either or both spots 16 and 17 is cut off so that solenoid switches 98 and 99 will both be in the de-energized condition, illustrated in FIGURE 11. At this time, because the escapement means has been "set up" one of the pawls 66 or 67 will be actuated.

With the switch arm 141 of selector switch 73 in the position shown, pawl 66 will be actuated. As solenoid 71 pulls pawl 66 outwardly, it engages switch 77 which closes the circuit through solenoid 135. This energizes solenoid 135 pulling latching arm 139 out of the way of latching arm 138 allowing switch arms 131 and 132 to return to their deenergized position. This breaks the circuit through solenoid 71 at terminal 133, at which time pawl 66 returns inwardly by action of the spring 70, breaking the circuit through solenoid 135 at switch 77. During this operation, the carriage 32 has advanced one step and the carriage will then be held against the pull of cable 33 by pawl 67 engaging one of the pins 65.

At this point, the circuitry will appear the same as in FIGURE 11, except that switch arm 141 will now be in contact with terminal 144. When the next answer illuminates one or both of the spots 16 and 17, solenoid 130 "sets up" the escapement means in the same manner as described above. Then, when the light of one or both of the spots 16 and 17 is cut off, solenoid 72 is energized pulling pawl 67 out of the way of the pin 65 which it engages. The movement of pawl 67 closes switch 78 which energizes solenoid 135 in the same manner as closing switch 77 with pawl 66 energizes the solenoid 135. From this point, the operation is the same as described just above and the carriage 32 has advanced one more step where it is ready for the next question.

*Description of the Scrambling Means*

The operation of the present embodiment has been hereinbefore described when light on the left photo cell L actuates solenoid switch 98 and light on the right photo cell R actuates solenoid switch 99. It can be readily seen that, if the system worked solely in this manner, it would be relatively easy for the student to cheat. For example, he could place another television set adjacent the set T and merely observe the signals broadcast to the spots on television screen 15. However, with the relatively simple scrambling means 35 of the present invention, the signals projected on the television screen 15 may be scrambled or coded according to the manner in which the particular IBM card 31 which is located in the recorder S is prepunched.

As can be seen in FIGURE 11, the four sets of opposed resilient electrical contacts of the scrambling means 35 are inter-coupled. Therefore, numerous permutations of the original signal on the face of the television tube are available according to the pre-punching of the card 31. For example, the instructor making up the test can cause light on photo cell L to actuate either or both of the solenoid switches 98 and 99.

The manner in which the scrambling means 35 works with the recorder S can be best explained by taking a series of specific examples. Assume that the instructor drafts a question to which the answer A is correct. He also determines that in order to prevent cheating by the students, he will cause illumination of spot 16 rather than 17 at the time of the question. In order to cause photo cell L to actuate solenoid switch 99 rather than solenoid switch 98, the instructor would punch a scrambling hole 152b (FIGURE 8) in row 3 of the card 31 at a position where it will allow contacts 102b and 104b to contact each other when the card 31 is in the proper position for that particular question. In the recorder S shown, the contact tips of the contacts 102a–d and 104a–d are offset three positions from the column of the three punches 88. Therefore, as can be seen, hole 151 which was produced in card 31 by pushing button A is offset three positions from pre-punched scrambling hole 152b. It is important to note that the "scrambling holes" are punched in the card 31 before the card is sent to the student.

Referring now to FIGURES 8 and 11 in particular, other examples of positions for the scrambling holes and the results will be described. If the instructor determines that answer A is to be correct and green light G will be illuminated when button A is pushed, then only solenoid switch 99 is to be actuated. Scrambling hole 152b, when aligned with contacts 102b and 104b, enables light on photo cell L to do this. Scrambling hole 153c in row 8 of the card 31 correspondingly permits light on photo cell R to accomplish the same thing. Alternatively, holes 154b and 154c in rows 3 and 8, respectively, would permit light on either or both of the photo cells L and R to actuate right solenoid switch 99 alone.

If it is desired that pushing button B will indicate a correct answer for a question, only left solenoid switch 98 is to be actuated. This may be accomplished with the card 31 coded in any of the following ways. With scrambling hole 155a in row 2, light on photo cell L will accomplish the desired result, whereas, if the instructor wishes to illuminate spot 17, and therefore photo cell R, scrambling hole 156d in row 9 is used. Further, with a scrambling hole in either row 2 or row 9 or both, solenoid switch 98 only will be energized whether photo cell L or photo cell R or both are subjected to light.

To exemplify the numerous combinations of scrambling holes which may be used to cause the green light G to light when button C is pushed, the following examples are given. In such case, both solenoid switches 98 and 99 must be energized. This may be accomplished by light on photo cell L alone by providing suitable scrambling holes, such as 157a and 157b in rows 2 and 3 of the card 31. Such actuation may also be accomplished by providing scrambling holes 158a, 158c, and 158d. Similarly, scrambling holes, such as 159b, 159c, and 159d working in combination will accomplish such actuation, as will scrambling holes 160a, 160b, 160c and 160d.

Numerous other permutations and combinations of scrambling holes may be provided which will enable light on either photo cell L or R or both to cause the proper solenoid switch or switches 98 or 99 to be actuated.

Although only one form of the present invention has been shown and described in detail hereinbefore, it will be apparent to those skilled in the art that such is by way of illustration only and numerous changes may be made without departing from the spirit of the invention. For instance, the selectivity of the system can be enlarged by increasing the number of bits in the binary system which is used to "sense" the answers from the television set T. Also, the answers could be transmitted to the recorder S through the audio link of the television system rather than through the use of selected light patterns. Further, although the major immediate use of systems incorporating the principles of this invention is in the field of education, they can be used for other information testing purposes. Therefore, this invention is to be limited solely to the scope of the following claims.

I claim:

1. Apparatus for use with a communications receiver in testing the learning of a person wherein there is simultaneously displayed by said receiver both correct and incorrect bits of information and a coded signal representing the individual correctness of said bits comprising, a selector comprising a device for each bit of information individually actuable to indicate the person's selection of the correct bit, indicating means on said selector responsive to said devices, control means for said indicating means responsive to the coded signal on said receiver to cause said indicating means to indicate the correctness of the person's selection, and means interposed between said control means and said indicating means to vary the correspondence between the coded signal and the indication afforded by said indicating means whereby the coded signals for succeeding displays by said receiver are caused to have different relationships to the bits of information in such succeeding displays.

2. Apparatus for use with a television receiver in testing the learning of a person wherein there is simultaneously displayed on said receiver both correct and incorrect bits of information and a coded signal representing the individual correctness of said bits comprising, a selector comprising a device for each bit of information on said receiver individually actuable to indicate the person's selection of the correct bit, indicating means on said selector responsive to said devices, control means for said indicating means responsive to the coded signal on said receiver to cause said indicating means to indicate the correctness of the person's selection, and means interposed between said control means and said indicating means to vary the correspondence between the coded signal and the indication afforded by said indicating means whereby the coded signals for succeeding displays on said receiver are caused to have different relationships to the correctness of the bits of information in such succeeding displays.

3. Apparatus for use with a television receiver in testing the learning of a person wherein there is simultaneously displayed on said receiver both correct and incorrect bits of information and a coded signal representing the individual correctness of said bits according to claim 2 wherein said coded signal on said television receiver is in the form of areas of different light intensity.

4. Apparatus for use with a television receiver in testing the learning of a person wherein there is simultaneously displayed on said receiver both correct and incorrect bits of information and a coded signal representing the individual correctness of said bits according to claim 3 wherein said control means includes photo-sensitive devices for sensing the areas of different light intensity of said coded signal.

5. Apparatus for use with a television receiver in testing the learning of a person wherein there is simultaneously displayed on said receiver both correct and incorrect bits of information and a coded signal representing the individual correctness of said bits comprising, a selector comprising a device for each bit of information on said receiver individually actuable to indicate the person's selection of the correct bit, indicating means on said selector responsive to said devices, control means for said indicating means responsive to the coded signal on said receiver and to operation of any one of said devices to cause said indicating means to indicate the correctness of the person's selections, a recording medium on said selector responsive to actuation of said devices to record the person's selection, and means interposed between said control means and said indicating means to vary the correspondence between the coded signal and the indication afforded by said indicating means whereby the coded signals for succeeding displays on said receiver are caused to have different relationships to the correctness of the bits of information on said succeeding displays.

6. Apparatus for use with a television receiver in testing the learning of a person wherein there is simultaneously displayed on said receiver both correct and incorrect bits of information and a coded signal representing the individual correctness of said bits comprising, a selector comprising a device for each bit of information from said receiver individually actuable to indicate the person's selection of the correct bit, indicating means on said selector responsive to said devices, control means for said indicating means responsive to the coded signal on said receiver and to operation of any one of said devices to cause said indicating means to indicate the correctness of the person's selection, a recording medium on said selector responsive to actuation of said devices to record the person's selection, said recording medium also including a preformed code thereon, and means interposed between said control means and said indicating means responsive to the preformed code on said recording medium to vary accordingly the correspondence between the coded signal and the indication afforded by said indicating means for succeeding displays whereby the coded signals for succeeding displays on said receiver are caused to have different relationships to the correctness of the bits of information in such succeeding displays.

7. Apparatus for use with a television receiver in testing the learning of a person wherein there is simultaneously displayed on said receiver both correct and incorrect bits of information and a coded signal representing the individual correctness of said bits according to claim 6 wherein said recording medium comprises a punch-card and punching means responsive to said device for providing a perforation in said card corresponding to the device actuated, said punch-card also being formed with perforations of said preformed code.

8. Apparatus for use with a television receiver in testing the learning of a person wherein there is simultaneously displayed on said receiver both correct and incorrect bits of information and a coded signal representing the individual correctness of said bits according to claim 7 wherein said means for varying the correspondence between the coded signals and the indication afforded by said indicating means includes means for sensing the perforated preformed code in said punch-card.

9. Apparatus for use with a communications receiver in testing the learning of a person wherein there is provided by said receiver a plurality of successive displays each of which has both correct and incorrect bits of information and a coded signal representing individual correctness of said bits comprising, a selector comprising a switch for each bit of information on one of said displays individually actuable to indicate the person's selection of the correct bit thereon, indicating means on said selector responsive to actuation of any one of said switches, control means for said indicating means responsive to the coded signal on said receiver to cause said indicating means to indicate the correctness of the person's selection, and means interposed between said control means and said indicating means responsive to actuation of any one of said switches to vary the correspondence in succeeding displays between the coded signal and the indication afforded by said indicating means in response to actuation of a given one of said switches, whereby the coded signals for one display do not reveal the relationship between the coded signal for a succeeding display and the correctness of the bits of information thereon.

10. Apparatus for use with a communications receiver in testing the learning of a person wherein there is provided by said receiver a plurality of successive displays each of which has both correct and incorrect bits of information and a coded signal representing individual correctness of said bits according to claim 9 wherein said indicating means comprises a pair of indicators for indicating respectively the correctness and incorrectness of the person's selection.

11. Apparatus for use with a communications receiver in testing the learning of a person wherein there is provided by said receiver a plurality of successive displays each of which has both correct and incorrect bits of information and a coded signal representing individual correctness of said bits according to claim 9 wherein the means to vary the correspondence in a succeeding display between the coded signal and the indication afforded by said indicating means includes a preformed code prearranged in accordance with the sequence of displays to be provided by said receiver.

12. Apparatus for use with a communications receiver in testing the learning of a person wherein there is provided by said receiver a plurality of successive displays each of which has both correct and incorrect bits of information and a coded signal representing individual correctness of said bits according to claim 11 wherein said preformed code comprises a punch-card for each sequence of displays formed with perforations corresponding to the correctness of the bits of information of each display and to the position of the correct bit in each such display.

13. Apparatus for use with a communications receiver in testing the learning of a person wherein there is provided by said receiver a plurality of successive displays each of which has both correct and incorrect bits of information and a coded signal representing individual correctness of said bits comprising, a selector comprising a switch for each bit of information on one of said displays individually actuable to indicate the person's selection of the correct bit thereon, indicating means on said selector responsive to actuation of any one of said switches, control means for said indicating means responsive to the coded signal on said receiver to cause said indicating means to indicate the correctness of the person's selection, recording means responsive to each of said switches to record the person's selection, and means interposed between said control means and said indicating means responsive to actuation of any one of said switches to vary the correspondence in succeeding displays between the coded signal and the indication afforded by said indicating means in response to actuation of a given one of said switches, whereby the coded signals for one display do not reveal the relationship between the coded signal for a succeeding display and the correctness of the bits of information thereon.

14. Apparatus for use with a communications receiver in testing the learning of a person wherein there is provided by said receiver a plurality of successive displays each of which has both correct and incorrect bits of information and a coded signal representing individual correctness of said bits comprising, a selector comprising a switch for each bit of information on one of said displays individually actuable to indicate the person's selection of a correct bit thereon, indicating means on said selector responsive to actuation of any one of said switches, control means for said indicating means responsive to the coded signal of said receiver to cause said indication means to indicate the correctness of the person's selection, recording means responsive to each of said switches to record the person's selection, said recording means also including a preformed code, and means interposed between said control means and said indicating means responsive to actuation of any one of said switches to vary in accordance with the preformed code on said recording medium the correspondence in succeeding displays between the coded signal and the indication afforded by said indicating means in response to actuation of a given one of said switches, whereby the coded signals for one display do not reveal the relationship between the coded signal for a succeeding display and the correctness of the bits of information thereon.

References Cited in the file of this patent

UNITED STATES PATENTS

| | | |
|---|---|---|
| Re. 23,030 | Holt | Aug. 24, 1948 |
| 2,104,718 | Dougherty | Jan. 4, 1938 |
| 2,302,002 | Bryce | Nov. 17, 1942 |
| 2,798,669 | Hale | June 9, 1957 |
| 2,835,052 | Raich | May 20, 1958 |
| 2,838,848 | Bergstad | June 17, 1958 |
| 2,870,548 | Chedister | Jan. 27, 1959 |
| 2,921,385 | Hamilton | Jan. 19, 1960 |
| 2,943,400 | Griswold | July 5, 1960 |